(12) United States Patent
Berger

(10) Patent No.: US 11,420,550 B2
(45) Date of Patent: Aug. 23, 2022

(54) ADJUSTING SYSTEM FOR PIVOTING AT LEAST ONE OPTICALLY RELEVANT COMPONENT OF A VEHICLE HEADLIGHT ABOUT A FIRST AND A SECOND AXIS

(71) Applicant: ZKW Group GmbH, Wieselburg (AT)

(72) Inventor: Martin Berger, Artstetten (AT)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 16/767,719

(22) PCT Filed: Dec. 17, 2018

(86) PCT No.: PCT/EP2018/085104
§ 371 (c)(1),
(2) Date: May 28, 2020

(87) PCT Pub. No.: WO2019/137736
PCT Pub. Date: Jul. 18, 2019

(65) Prior Publication Data
US 2020/0384910 A1 Dec. 10, 2020

(30) Foreign Application Priority Data
Jan. 11, 2018 (EP) .................................. 18151125

(51) Int. Cl.
*B60Q 1/068* (2006.01)
*B60Q 1/12* (2006.01)
(52) U.S. Cl.
CPC .............. *B60Q 1/068* (2013.01); *B60Q 1/12* (2013.01)
(58) Field of Classification Search
CPC ..................................................... B60Q 1/06
See application file for complete search history.

(56) References Cited

U.S. PATENT DOCUMENTS 5,868,488 A * 2/1999 Speak ..................... B60Q 1/18
362/37
6,478,457 B1 * 11/2002 Manley .................... B60Q 1/10
362/275
(Continued)

FOREIGN PATENT DOCUMENTS

EP 2724888 A2 4/2014
EP 3048360 A1 7/2016
(Continued)

OTHER PUBLICATIONS

International Search Report for PCT/EP2018/085104, dated Mar. 6, 2019 (2 pages).
(Continued)

*Primary Examiner* — Eric T Eide
(74) *Attorney, Agent, or Firm* — Eversheds Sutherland (US) LLP

(57) ABSTRACT

The invention relates to an adjusting system (1) for pivoting at least one optically relevant component (2) of a vehicle headlight about a first and a second axis (y, z), the system comprising a first retaining element (3) for holding the optically relevant component (2), a second retaining element (4) for displaceably holding the first retaining element (3) on the second retaining element (4), a carrying frame (5) for displaceably holding the second retaining element (4) on the carrying frame (5), and a first adjusting device (6) acting on the first retaining element (3) for displacing the first retaining element (3) relative to the second retaining element (4), and a second adjusting device (7) acting on the second retaining element (4) for displacing the second retaining element (4) relative to the carrying frame (5).

15 Claims, 10 Drawing Sheets

(56) References Cited

U.S. PATENT DOCUMENTS

Figure 1:
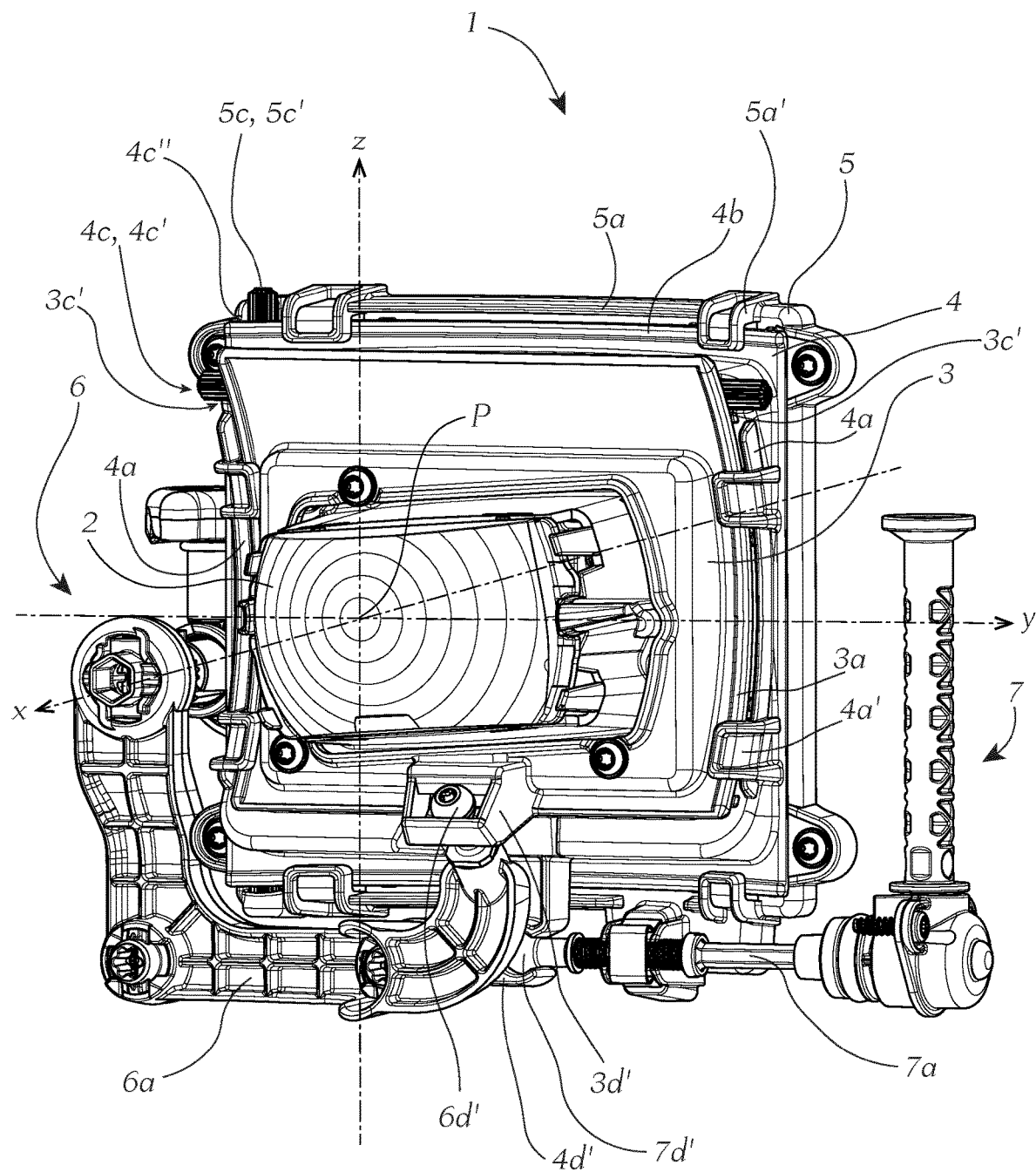

| | | | |
|---|---|---|---|
| 8,577,556 B1 * | 11/2013 | Noel, II | B60Q 1/18 |
| | | | 701/49 |
| 9,010,973 B2 * | 4/2015 | Koo | B60Q 1/076 |
| | | | 362/418 |
| 10,081,293 B2 * | 9/2018 | Ramos Valencia .. | B60Q 1/0076 |
| 2011/0063866 A1 | 3/2011 | Shibata et al. | |
| 2015/0009699 A1 | 1/2015 | Takii | |
| 2015/0085511 A1 * | 3/2015 | Shibata | F21S 41/635 |
| | | | 362/512 |

FOREIGN PATENT DOCUMENTS

| | | | |
|---|---|---|---|
| JP | 2014086301 A | 5/2014 | |
| JP | 2015015186 A | 1/2015 | |

OTHER PUBLICATIONS

Search Report for European Patent Application No. 18151125, dated Jun. 29, 2018 (2 pages).
Office Action dated May 11, 2021, in counterpart JP Patent Application No. 2020-529749.

* cited by examiner

Schritt 1

Schritt 2

Schritt 3

Schritt 4

Schritt 5

Schritt 6

Schritt 7

ADJUSTING SYSTEM FOR PIVOTING AT LEAST ONE OPTICALLY RELEVANT COMPONENT OF A VEHICLE HEADLIGHT ABOUT A FIRST AND A SECOND AXIS

The invention relates to an adjusting system for pivoting at least one optically relevant component of a vehicle headlamp about a first and a second axis. Furthermore, the invention relates to an illumination device for a motor-vehicle headlamp, comprising an adjusting system according to the invention. In addition, the invention relates to a vehicle headlamp, motor-vehicle headlamp in particular, having an adjusting system according to the invention and/or an illumination device according to the invention.

Adjusting systems are known from the prior art and are often used in vehicle headlamp applications for adjusting the vertical deflection (headlamp beam adjustment for example) or the horizontal deflection (basic setting or cornering beam for example) of a light distribution.

An adjusting system of this type has become known for example from AT 513918 B1. On the one hand, adjusting systems should allow a reliable adjustment of an optically relevant component, on the other hand, the space requirement of such adjusting systems should be minimized, in order to limit the conception of a vehicle headlamp as little as possible.

Conventional adjusting systems, in most cases, comprise an adjustment triangle with a fixed bearing point and two points of action, wherein the connection made up of the fixed bearing point and one point of action forms a respective axis, and a pivoting movement is created by displacement of the points of action. Such adjusting systems have a certain space requirement owing to the construction of the pivoting triangle.

It is therefore an object of the invention to create an adjusting system which has a reduced space requirement. This object is achieved using an adjusting system of the type mentioned at the beginning, which has the following features according to the invention, namely a first support element for holding the optically relevant component, a second support element for displaceably holding the first support element on the second support element, a carrying frame for displaceably holding the second support element on the carrying frame, and also a first adjusting device configured to engage the first support element for displacing the first support element in relation to the second support element, and a second adjusting device configured to engage the second support element for displacing the second support element in relation to the carrying frame, wherein the first support element and the second support element have a first group of guide means, which are in engagement with one another, by means of which first group of guide means, a displacement of the first support element is guided about the second support element along a circular arc around the first axis, and wherein the second support element and the carrying frame have a second group of guide means, which are in engagement with one another, by means of which second group of guide means, a displacement of the second support element is guided in relation to the carrying frame along a circular arc around the second axis, wherein the first and the second axis are orientated perpendicular to one another.

By abandoning a classic structure with adjusting arms and bearing points, which form an adjustment triangle, and instead replacing support elements, which can be displaced along circular arcs, according to the invention, it is possible to reduce the construction volume of an adjusting system considerably. The adjusting system according to the invention allows the adjustment along a dish-shaped circular arc.

Therein, the circular arcs are chosen in such a manner that the associated axes of rotation are located inside or—measured along a main radiation direction—at the apex point or outside the optically relevant component in a region arranged downstream of the optically relevant component.

As optically relevant components there are considered, in particular: screens, light sources, particularly LEDs and/or laser light sources, reflectors, lenses and/or entire lighting modules or assemblies, etc. Therefore, some or a plurality of these mentioned components may form the optically relevant component, which can be adjusted with the aid of the adjusting system.

In particular, some embodiments may include that the first axis is orientated horizontal and the second axis is orientated vertical. The specifics about the orientation relate in this case to the installed state of the adjusting system. The headlamp level of a vehicle headlamp can for example be regulated via the horizontal axis. The light image of a vehicle headlamp can be pivoted laterally by means of the vertical axis.

Alternatively thereto, some embodiments may include that the first axis is orientated vertical and the second axis is orientated horizontal.

In particular, some embodiments may include that the optically relevant component comprises an imaging optical element. Within this disclosure, an imaging optical element is understood to mean any optical element by means of which a light distribution is finally shaped. In this case, this may be a reflector, for example. However, in most cases, a lens, particularly a projection lens, is provided for final light shaping.

The adjusting system may beneficially be configured in such a manner that the imaging optical element has a main radiation direction, which in a centre position is orientated perpendicular to the first and second axis. To this end, some embodiments may include that the imaging optical element has a main radiation direction along an optical axis, wherein the imaging optical element can be pivoted about the first and the second axis in such a manner that the optical axis can be orientated perpendicular to the first and second axis.

In particular, some embodiments may include that the imaging optical element is a lens, particularly a projection lens.

Additionally, some embodiments may include that the first and the second axis intersect one another. As a result, it is possible to pivot the optically relevant component about one single point exclusively—namely the point of intersection of the two axes.

In particular, some embodiments may include that the imaging optical element, particularly a projection lens, has an apex, wherein the first and the second axes intersect one another in the region of the apex. This results in the particular advantage that a pivoting movement takes place about the apex of the imaging optical element exclusively. In this case, a pivoting movement leads to this only changing the orientation of the apex, but not the position thereof, however. As the apex of the imaging optical element in a vehicle headlamp housing is typically the component which protrudes furthest in the direction of a cover plate, this property is particularly advantageous, as the apex remains positionally stable during a pivoting movement and thus the space requirement of the imaging optical element is minimal in spite of the pivotability. As mentioned previously, the apex point lies in the direction of the optical axis of the imaging optical element, at the apex thereof, wherein the expression "in the region" means that the aim is to allow the point of intersection of the axes to substantially coincide with the apex point, but deviations of a few millimetres may occur.

Advantageously, some embodiments may include that the first group of guide means has at least one circular-arc-shaped accommodating section, in which at least one corresponding guide projection likewise assigned to the first group of guide means is accommodated, wherein the accommodating section is assigned to the second support element and the guide projection is assigned to the first support element, or vice versa. As a result, guiding along a circular arc can be realized in an efficient manner.

At this point, it is noted that all of the circular arcs mentioned form a section of a circular path in each case, wherein the circular arcs may extend over an angle of between 2° and 45° for example, particularly between 5 and 20°, particularly preferably between 7 and 15°.

Additionally, some embodiments may include that a rotary shaft is mounted on the second support element, which is orientated parallel to the first axis and has at least one toothed section, wherein the first support element has a corresponding toothing, by means of which the first support element is supported on the second support element, wherein the toothing of the first support element is in engagement with the toothed section in such a manner that pivoting of the first support element about the first axis effects a rotational movement of the rotary shaft. The rotary shaft therefore supports the first support element and prevents movement play of the associated pivoting apparatus.

Advantageously, some embodiments may include that the second group of guide means has at least one circular-arc-shaped accommodating section, in which at least one corresponding guide projection likewise assigned to the second group of guide means is accommodated, wherein the accommodating section is assigned to the carrying frame and the guide projection is assigned to the second support element or vice versa. As a result, guiding along a circular arc can be realized in an efficient manner.

Additionally, some embodiments may include that a rotary shaft is mounted on the carrying frame, which is orientated parallel to the second axis and has at least one toothed section, wherein the second support element has a corresponding toothing, by means of which the second support element is supported on the carrying frame, wherein the toothing of the second support element is in engagement with the toothed section in such a manner that pivoting of the second support element about the second axis effects a rotational movement of the rotary shaft. The rotary shaft therefore supports the second support element and prevents movement play of the associated pivoting apparatus.

The first support element may be held displaceably in a guide path for pivoting about a horizontal axis, wherein the guide path is formed as a circular arc, the centre point of which forms the axis of rotation, wherein the axis of rotation is orientated horizontally and the apex point intersects the projection lens.

In particular, some embodiments may include that the first adjusting device is configured to be fixedly connected to a vehicle headlamp housing, wherein the first adjusting device has a pivoting arm, which can be pivoted about an axis, which is orientated parallel to the first axis, by means of the first adjusting device, wherein the pivoting arm has a coupling section, which is configured to engage into a corresponding coupling section of the first support element for pivoting the first support element about the first axis, wherein the coupling sections are configured to transmit a pivoting movement of the pivoting arm to the first support element in a force-locking manner, wherein the coupling sections are displaceable relatively to one another. The coupling sections can in this case be constructed to be displaceable in the direction of the first axis and transversely thereto.

Additionally, some embodiments may include that the second adjusting device is configured to be fixedly connected to a vehicle headlamp housing, wherein the second adjusting device has a sliding arm, which is displaceable in the direction of the first axis by means of the second adjusting device, wherein the sliding arm has a coupling section, which is configured to engage into a corresponding coupling section of the second support element for pivoting the second support element about the second axis, wherein the coupling sections are configured to transmit a sliding movement of the sliding arm to the second support element in a force-locking manner.

The adjustment of the optically relevant component by means of the first adjusting device takes place independently of an adjustment by means of the second adjusting device. That is to say, the adjusting devices function independently of one another. Both adjusting devices should not influence one another—e.g. in the case of vertical adjustment, the horizontal deviation can be at most e.g. 0.7°.

Furthermore, the invention relates to an illumination device for a motor-vehicle headlamp, comprising an adjusting system according to the invention and an optically relevant component. The illumination device may further include at least one light source or else a plurality of light sources, wherein LED light sources, halogen light sources and/or laser light sources may be provided in this case, for example.

In addition, the invention relates to a vehicle headlamp, motor-vehicle headlamp in particular, having an adjusting system according to the invention or an illumination device according to the invention. Additionally, the invention relates to a vehicle, a motor vehicle in particular, having at least one vehicle headlamp according to the invention.

The adjusting system according to the invention can be used for adjusting a multiplicity of different light distributions and lighting systems. For example, an adjusting system of this type may be used for cornering beam, dipped beam, main beam, laser scanners, LED matrix headlamps, etc.

Figure 3:
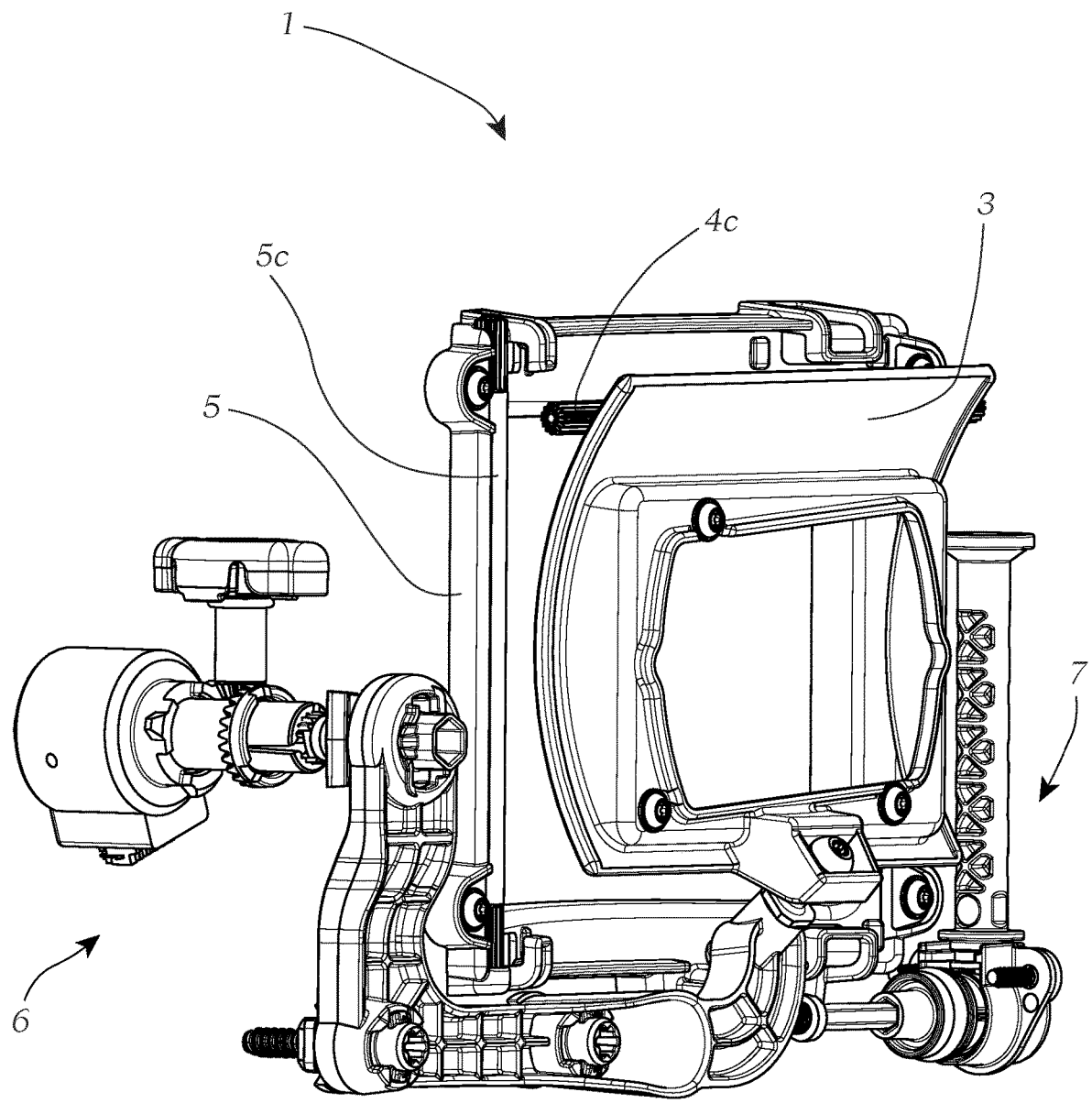
Figure 4:
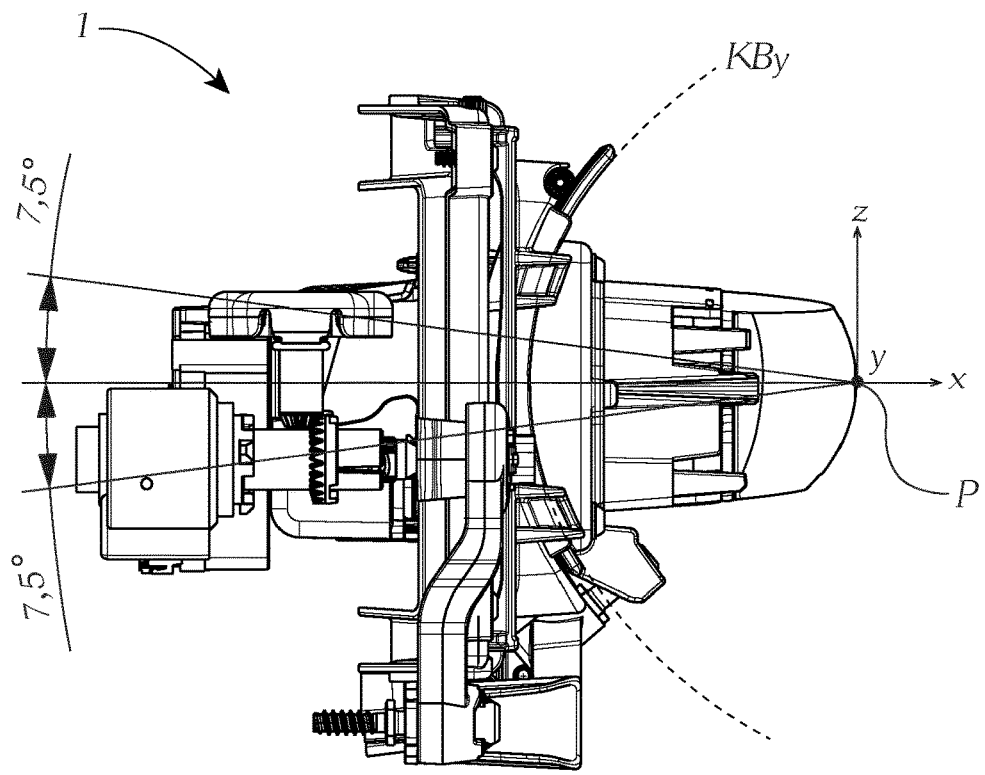

The invention is explained in more detail in the following on the basis of exemplary and non-limiting embodiments, which are shown in the figures. In the figures FIG. 1 shows a perspective illustration of a first embodiment of an adjusting system according to the invention, FIG. 2 shows a further perspective illustration of the adjusting system according to FIG. 1, FIG. 3 shows a perspective illustration of individual components of the adjusting system according to FIGS. 1 and 2, FIG. 4 shows a side view onto the adjusting system according to FIGS. 1 to 3, FIG. 5 shows a bottom view onto the adjusting system according to FIGS. 1 to 4, FIG. 6 shows an exploded illustration of the adjusting system according to FIGS. 1 to 5, FIG. 7 shows a perspective illustration of the horizontal pivoting mechanism of the adjusting system according to FIGS. 1 to 6, FIGS. 8a and 8b show detail illustrations of a pivoting arm from FIG. 7, FIGS. 9a to 9g show individual steps of mounting the adjusting system according to FIGS. 1 to 8b, and FIG. 10 shows an alternative embodiment of an adjusting system according to the invention.

In the following figures the same reference numbers label the same features, unless specified otherwise.

Figure 2:
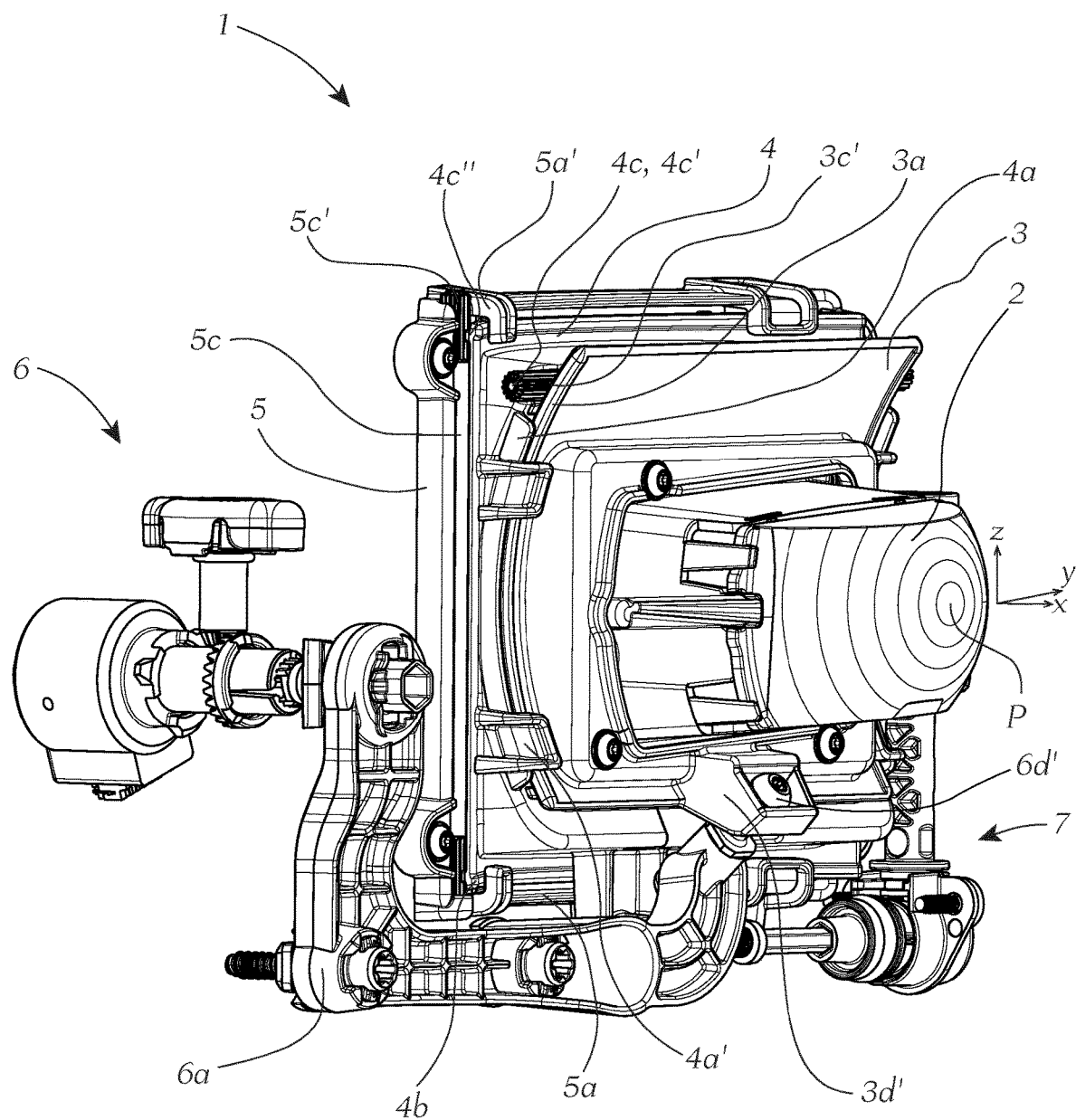

FIGS. 1 and 2 show different perspective illustrations of a first embodiment of an adjusting system 1 according to the invention for pivoting at least one optically relevant component 2 of a vehicle headlamp about a first and a second axis y and z.

The adjusting system 1 comprises a first support element 3 for holding the optically relevant component 2, a second support element 4 for displaceably holding the first support element 3 on the second support element 4, a carrying frame 5 for displaceably holding the second support element 4 on the carrying frame 5 and a first adjusting device 6 acting on the first support element 3 for displacing the first support element 3 relative to the second support element 4. Furthermore, the adjusting system 1 comprises a second adjusting device 7 acting on the second support element 4 for displacing the second support element 4 relative to the carrying frame 5, wherein the first support element 3 and the second support element 4 have a first group of guide means 3a and 4a, which are in engagement with one another. The first group of guide means 3a, 4a guides a displacement of the first support element 3 around the second support element 4 along a circular arc KBy (cf. FIG. 4) around the first axis y. In the present example, the first axis is orientated horizontal and perpendicular to the main direction of travel x of a vehicle, wherein the main direction of travel x spans a plane with the first axis y, which is orientated perpendicular to a vertically orientated second axis z. Alternatively, the first axis y could likewise be orientated vertically and the second axis z could be orientated horizontally.

The second support element 4 and the carrying frame 5 have a second group of guide means 4b and 5a, which are in engagement with one another, by means of which second group of guide means 4b, 5a, a displacement of the second support element 4 is determined in relation to the carrying frame 5 along a circular arc KBz (cf. FIG. 5) about the second axis z. The first and the second axis y and z are orientated perpendicular to one another in this case. In this case, the arcs are formed in such a manner that the respective axis coincides with the centre point of the respective arc.

The first group of guide means 3a, 4a has at least one circular-arc-shaped accommodating section 4a, which is delimited by a retaining lug 4a' in such a manner that a guide means 3a—which is constructed e.g. in the form of a projection—accommodated in the accommodating section 4a can be pivoted exclusively about the axis y in the mounted state and displacements in other directions are prevented to the greatest extent possible. Four retaining lugs 4a' are provided for this purpose in the present embodiment, which are constructed on opposite sides of the second retaining means 4. FIG. 1 shows retaining lugs 4a' of a right side and FIG. 2 shows retaining lugs 4a' of a left side of the adjusting system 1 (seen from the front). Furthermore, it can be seen in FIG. 1 that a rotary shaft 4c is mounted on the second support element 4, which rotary shaft is orientated parallel to the first axis y and has at least one toothed section 4c', wherein the first support element 3 has a corresponding toothing 3c', by means of which the first support element 3 is supported on the second support element 4. The toothing 3c' of the first support element 3 is in engagement with the toothed section 4c' in such a manner that pivoting of the first support element 3 about the first axis y effects a rotational movement of the rotary shaft 4c. The rotary shaft 4c therefore minimizes the movement play of the first support element 3 and ensures particularly reliable guiding.

Analogously to the first group, a second group of guide means may also be provided. The second group of guide means 4b and 5a has at least one circular-arc-shaped accommodating section 5a, in which at least one corresponding guide projection 4b likewise assigned to the second group of guide means 4b and 5a is accommodated. The accommodating section 5a is assigned to the carrying frame 5 and the guide projection 4b is assigned to the second support element 4 (or vice versa). Retaining lugs 5a' are constructed on the carrying frame 5. Furthermore, a rotary shaft 5c is mounted on the carrying frame 5, which rotary shaft is orientated parallel to the second axis z and has at least one toothed section 5c', wherein the second support element 4 has a corresponding toothing 4c'', by means of which the second support element 4 is supported on the carrying frame 5. The toothing 4c'' of the second support element 4 is in engagement with the toothed section 5c' in such a manner that pivoting of the second support element 4 about the second axis z effects a rotational movement of the rotary shaft 5c. Analogously to the rotary shaft 4c, the rotary shaft 5c brings about a minimization of the play of the displacement mechanism.

In the present embodiment, it is envisaged that the optically relevant component 2 comprises an imaging optical element, namely in the form of a projection lens. The projection lens has a main radiation direction along an optical axis, wherein the imaging optical element can be pivoted about the first and the second axes y and z in such a manner that the optical axis can be orientated perpendicular to the first and second axes y and z. In other words, this means that the circular arcs 4a and 5a or the entire adjusting mechanism are constructed accordingly. As can be seen in FIG. 1, the projection lens 2 has an apex point P, wherein the first and the second axes y and z intersect one another in the region of the apex point P.

The first adjusting device 6 is configured to be fixedly connected to a vehicle headlamp housing, wherein the first adjusting device 6 has a pivoting arm 6a, which can be pivoted about an axis, which is orientated parallel to the first axis y, by means of the first adjusting device 6, wherein the pivoting arm 6a has a coupling section 6d', which is configured to engage into a corresponding coupling section 3d' of the first support element 3 for pivoting the first support element 3 about the first axis y. The coupling sections 6d' and 3d' are configured to transmit a pivoting movement of the pivoting arm to the support element 3 in a force-locking manner, wherein the coupling sections 6d' and 3d' are displaceable relative to one another.

Figure 8A:
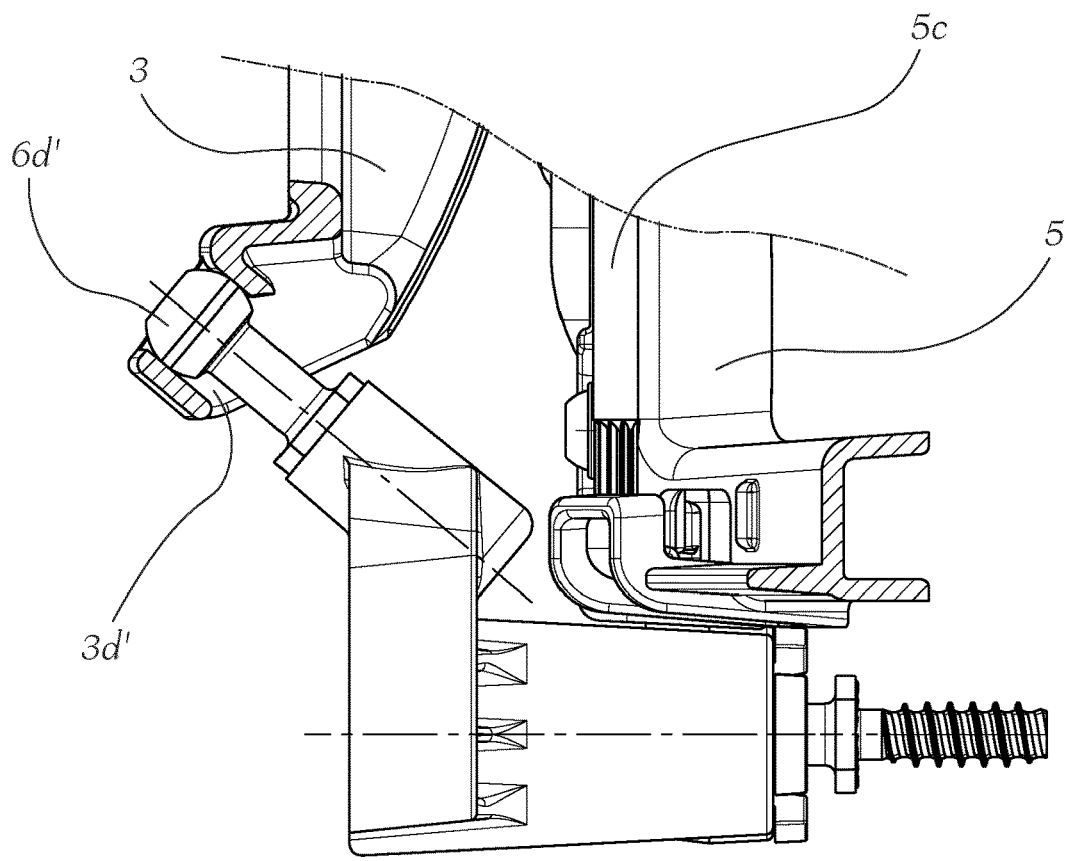
Figure 8B:
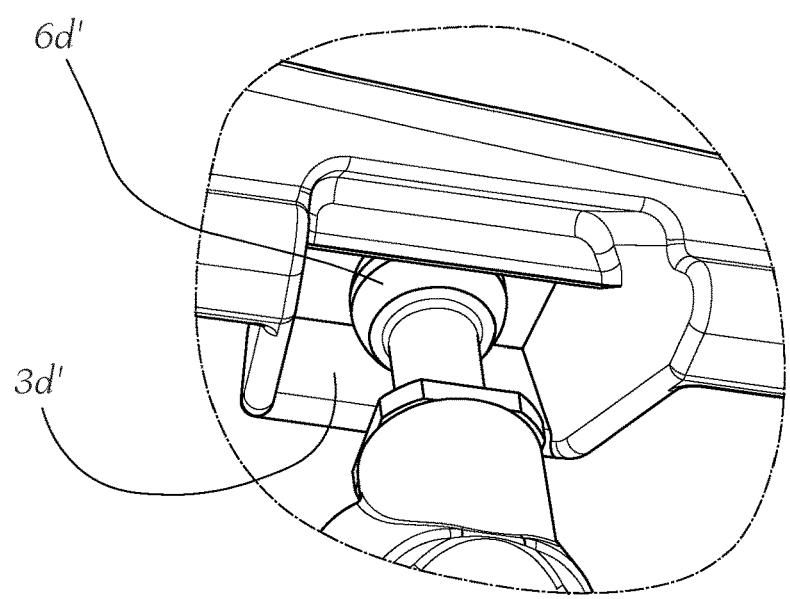
Figure 9A:
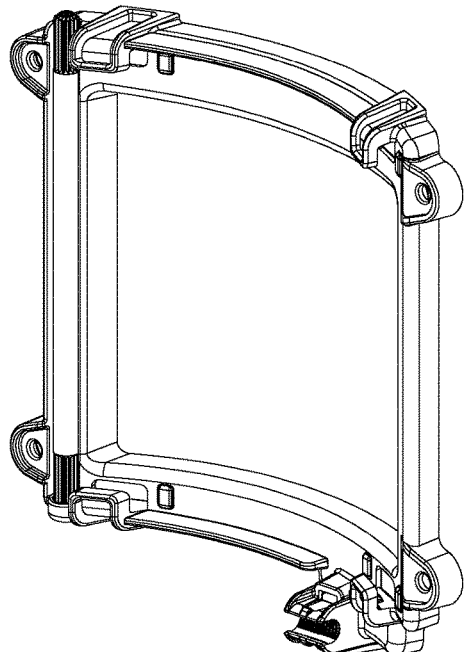
Figure 9B:
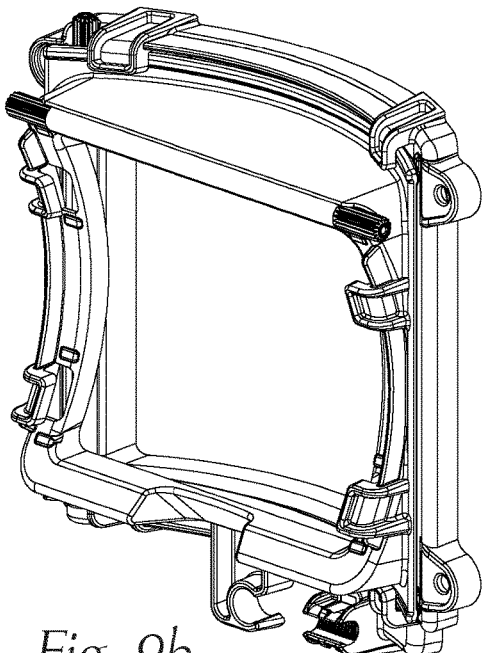
Figure 9C:
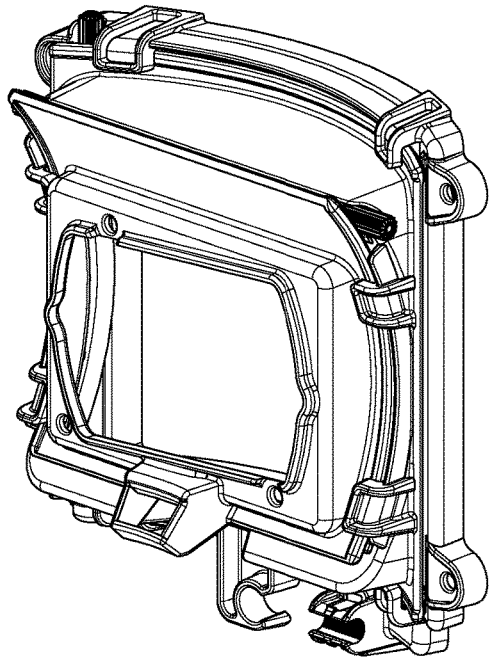
Figure 9D:
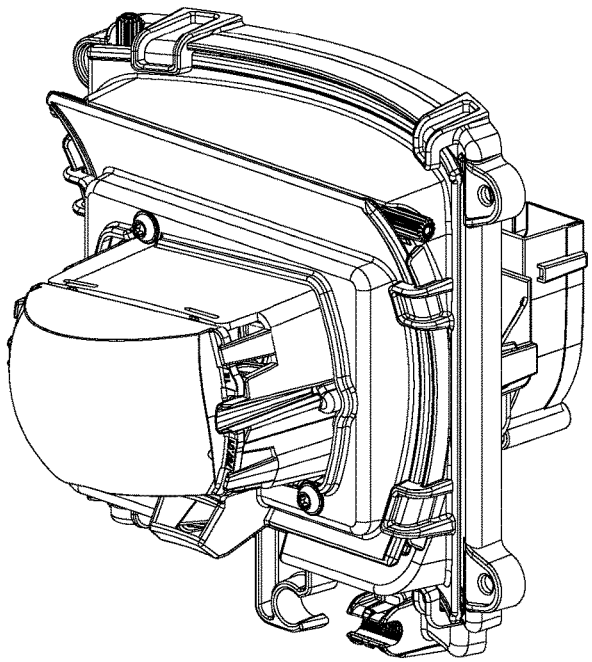
Figure 9E:
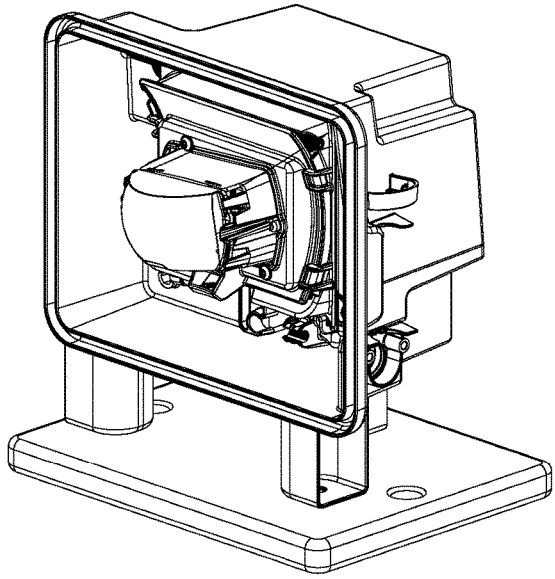
Figure 9F:
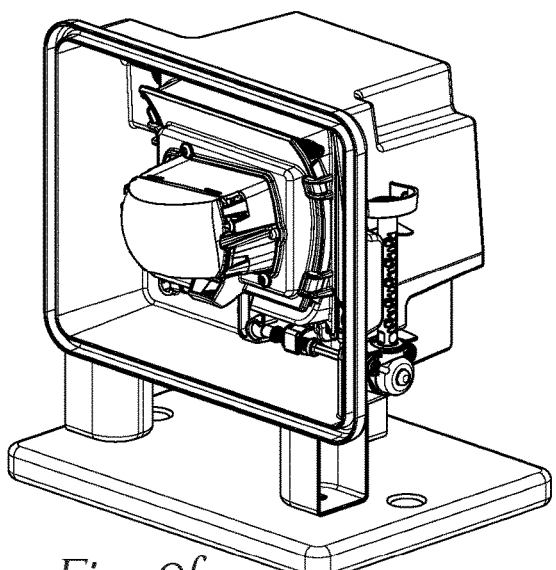
Figure 9G:
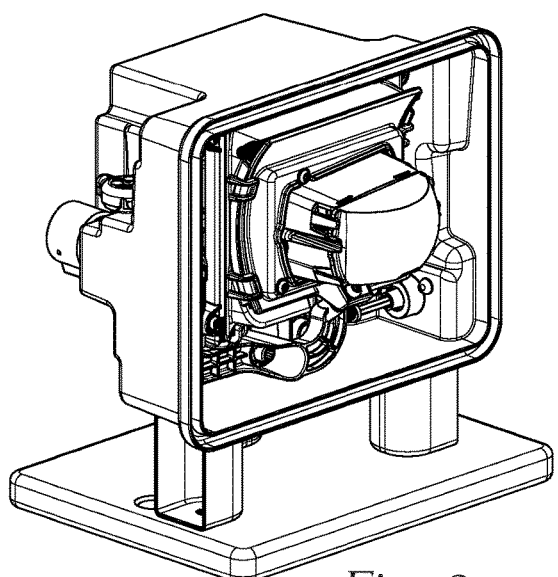

The interaction of the coupling sections 6d' and 3d' is illustrated in more detail in FIGS. 8a and 8b. It can be seen therein that the coupling section 6d' is constructed as a spherical head, which is accommodated in a correspondingly shaped depression 3d', wherein the spherical head can be displaced inside the depression in such a manner that on the one hand, a pivoting movement of the arm 6a is transmitted to the first support element 3 in a force-locking manner, on the other hand, a movement path deviating due to the different pivot axes of pivoting arm 6a and first support element 3 can be compensated. Likewise, a displacement in the direction of the y axis is possible, which is brought about as a consequence of pivoting of the second support element 4 about the second axis z, as the first support element 3 is moved together with the second support element 4.

Figure 6:
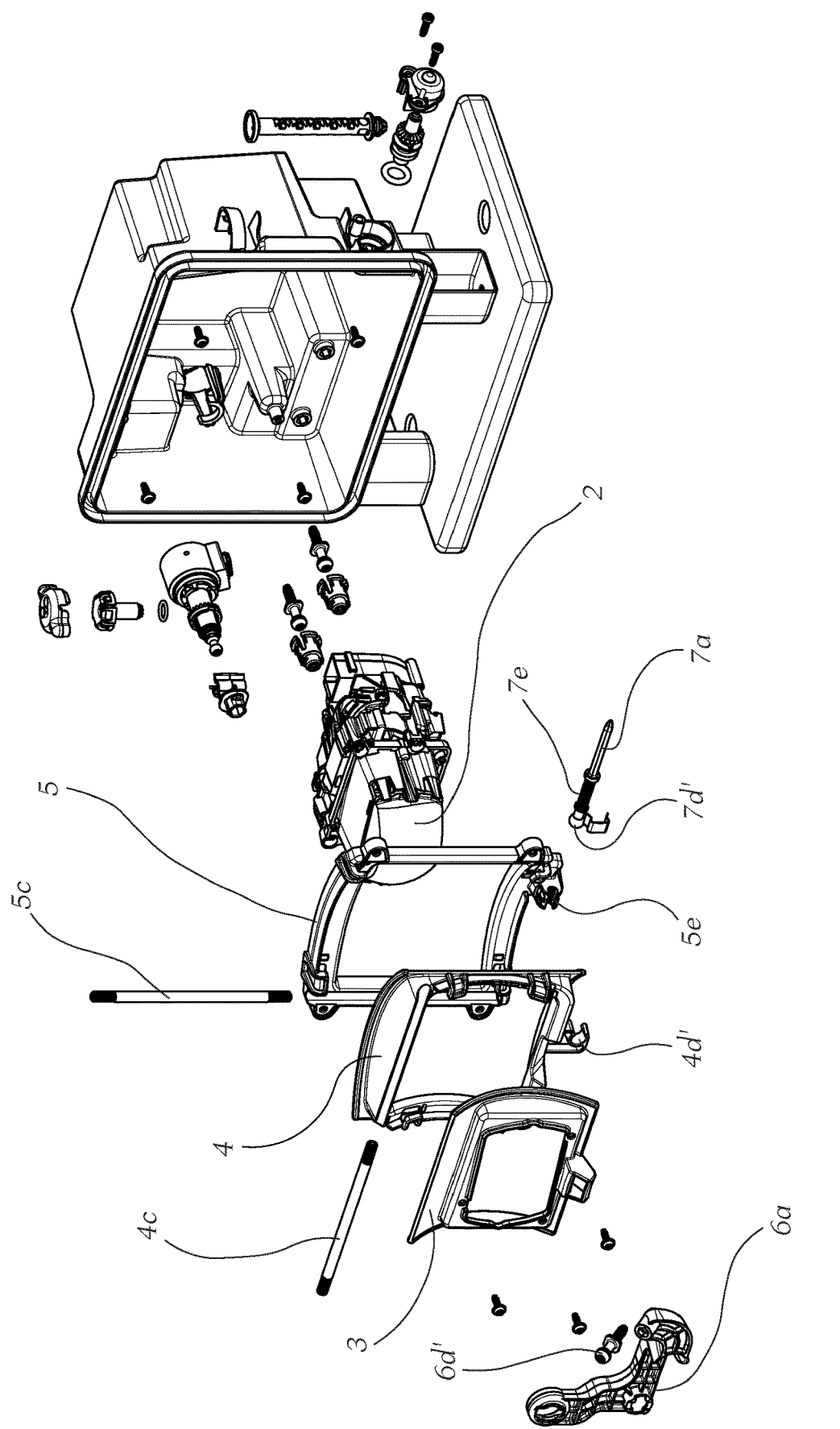

It can be seen in FIG. 1 and FIG. 6 that the second adjusting device 7 of the adjusting system 1 has a sliding arm 7a, which can be displaced in the direction of the first axis y by means of the second adjusting device 7, wherein the sliding arm 7a has a coupling section 7d', which is configured to engage into a corresponding coupling section 4d' of the second support element 4 for pivoting the second support element 4 about the second axis z, wherein the coupling sections 4d' and 7d' are configured to transmit a sliding movement of the sliding arm 7a to the second support element 4 in a force-locking manner. In the embodiment shown, the coupling section 7d' is realized as a spherical head, which engages into a corresponding cylindrical accommodating opening 4d', wherein the longitudinal axis of the cylindrical accommodating opening is orientated perpendicular to the first axis y. A longitudinal displacement of the sliding arm 7a can be achieved in the present exemplary embodiment by rotation about its longitudinal axis, as the sliding arm 7a has a threaded section 7e, which acts on a threaded section 5e of the fixed carrying frame 5 (cf. FIG. 6). The configuration of the adjusting devices 6 and 7 is not covered in more detail in the following, as such devices are sufficiently well known from the prior art and in the present case only have to be configured to displace the sliding arm 7a or pivot the pivoting arm 6a.

Figure 5:
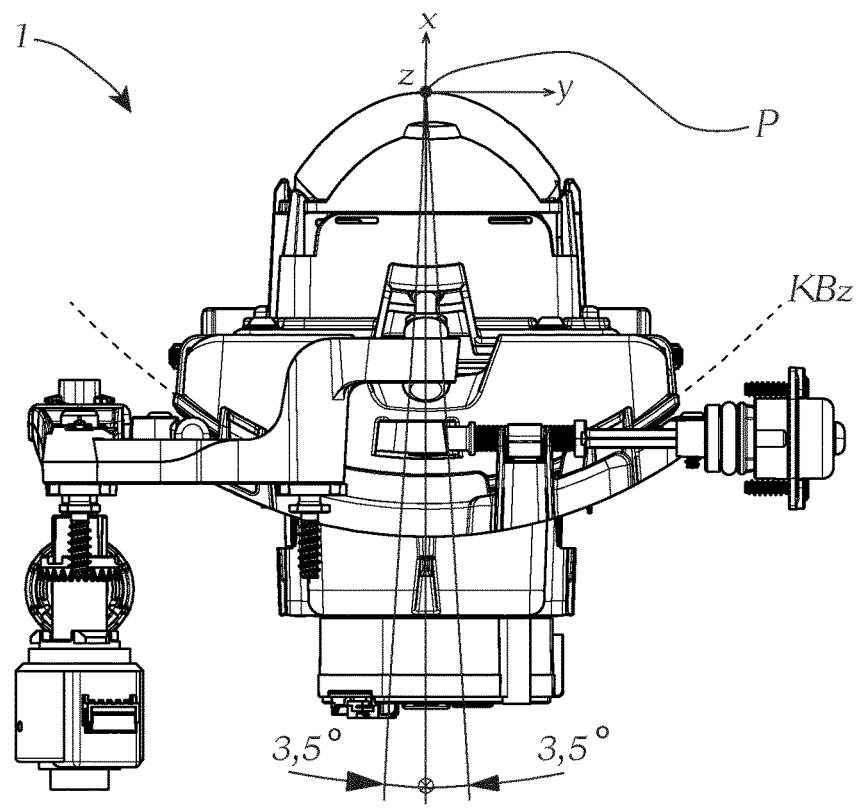

FIGS. 3 to 5 show different views of the adjusting system 1, wherein only isolated reference numbers have been entered to give a better overview. It can be seen in FIG. 4 that the exemplary vertical adjustment range comprises an angle of +/−7.5°, starting from a zero position. It can be seen in FIG. 5 that the exemplary lateral adjustment range is an angle of +/−3.5°, starting from a zero position.

Figure 7:
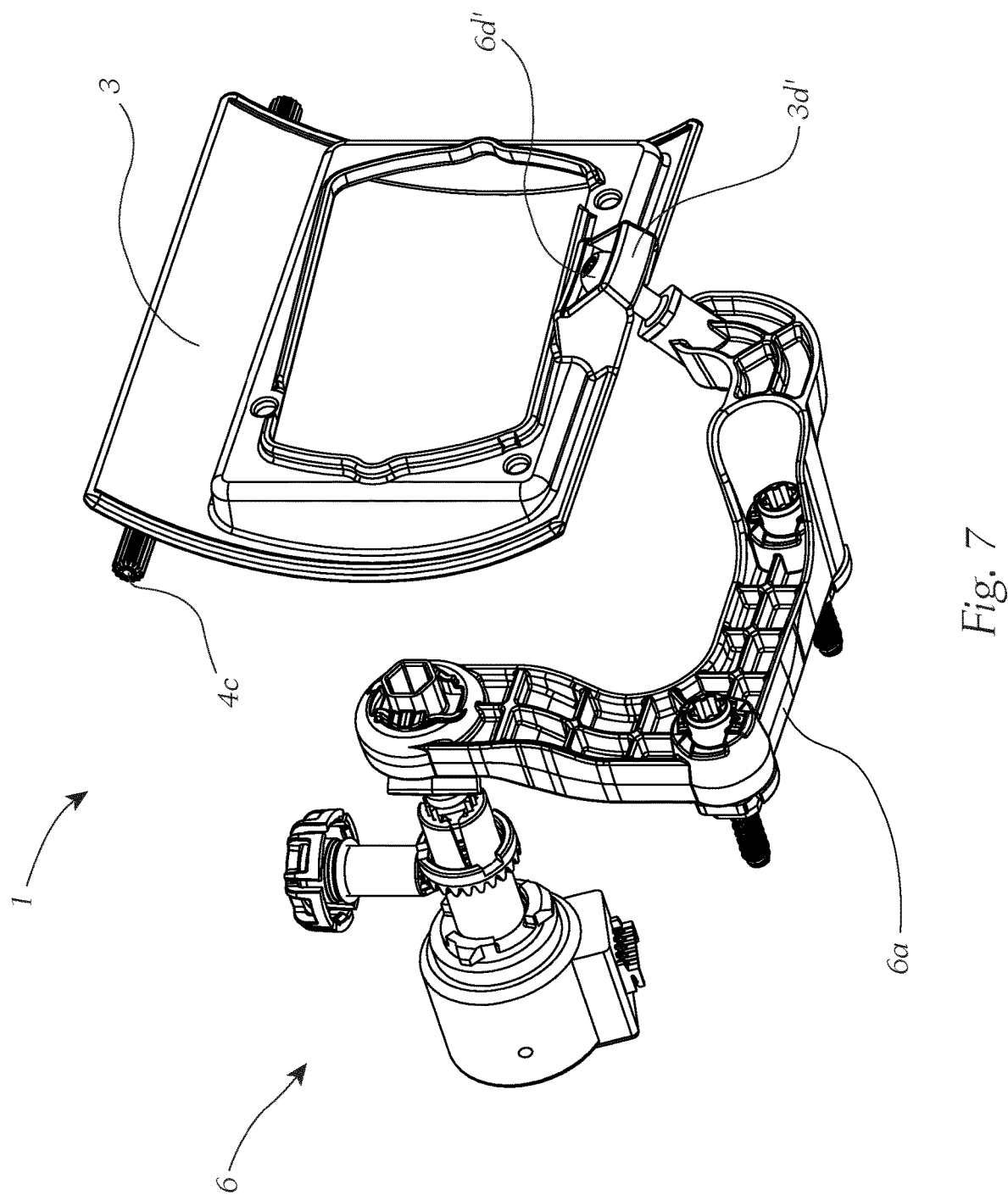

FIG. 7 shows a perspective detail illustration of the already described horizontal pivoting mechanism of the adjusting system 1. FIGS. 9a to 9g show individual steps of mounting the adjusting system according to FIGS. 1 to 8b, wherein no reference numbers are shown for a better overview.

Figure 10:
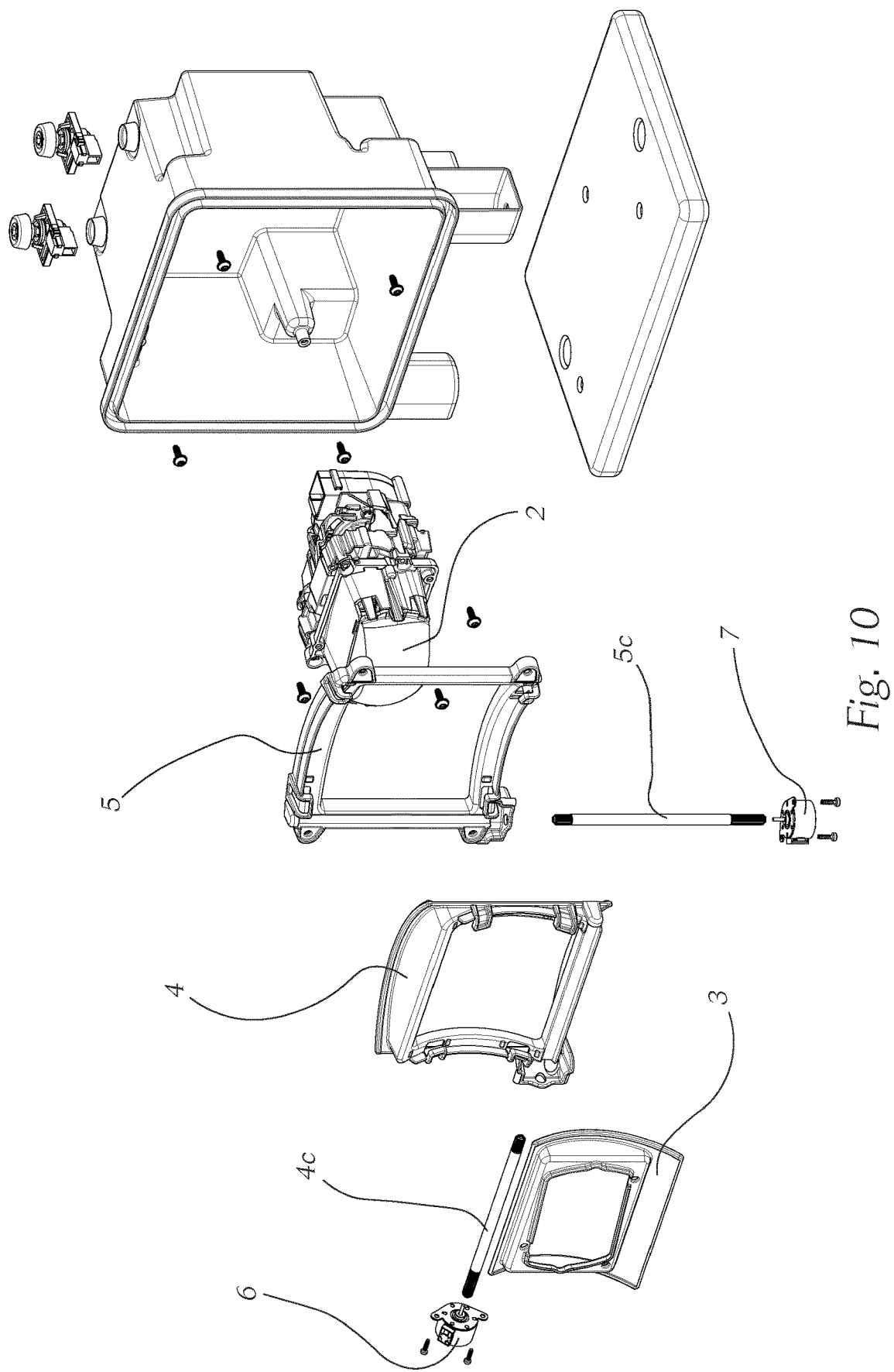

FIG. 10 shows an alternative embodiment of an adjusting system 1 according to the invention. The adjusting devices 6 and 7 are constructed differently, namely as servomotors, the rotary spindle of which acts on the rotary shaft 4c or 5c directly.

Fundamentally, the invention can be used for a multiplicity of different light functions. Cornering beams, dipped beams, main beams, laser scanners, LED matrix lights, etc. are mentioned at this point by way of example.

Considering this teaching, the person skilled in the art is able, without inventive effort, to arrive at different embodiments of the invention, which are not shown. The invention is therefore not limited to the embodiments shown. Also, individual aspects of the invention or the embodiments may be picked up and combined with one another. What are important are ideas upon which the invention is based, which may be realized by a person skilled in the art, in knowledge of this description, in myriad ways and be maintained as such in spite of that. Any reference numbers in the claims are exemplary and used only for easier readability of the claims, without limiting the same.

LIST OF REFERENCE NUMBERS

1 Adjusting system
2 Optically relevant component (projection lens)
3 First support element
3a Guide means, first group
3c' Toothing (corresponding to 4c')
3d' Coupling section
4 Second support element
4a Guide means, first group
4a' Retaining lug
4b Guide means, second group
4c Rotary shaft
4c' Toothed section (corresponding to 3c')
4c" Toothing (corresponding to 5c')
4d' Accommodating opening
5 Carrying frame
5a Guide means, second group
5a' Retaining lug
5c Rotary shaft
5c' Toothed section (corresponding to 4c")
5e Threaded section
6 First adjusting device
6a Pivoting arm
6d' Coupling section
7 Second adjusting device
7a Sliding arm
7d' Coupling section
7e Threaded section

The invention claimed is:

1. An adjusting system (1) for pivoting at least imaging optical element (2) of a vehicle headlamp about a first and a second axis (y, z), the system comprising:
a first support element (3) configured to hold the imaging optical element (2),
a second support element (4) configured to displaceably hold the first support element (3) on the second support element (4),
a carrying frame (5) configured to displaceably hold the second support element (4) on the carrying frame (5), and
a first adjusting device (6) configured to engage the first support element (3) for displacing the first support element (3) relative to the second support element (4), and
a second adjusting device (7) configured to engage the second support element (4) for displacing the second support element (4) relative to the carrying frame (5),
wherein the first support element (3) and the second support element (4) have a first group of guide means (3a, 4a), which are in engagement with one another, by means of which first group of guide means (3a, 4a), a displacement of the first support element (3) is guided about the second support element (4) along a circular arc (KBy) around the first axis (y),
wherein the second support element (4) and the carrying frame (5) have a second group of guide means (4b, 5a), which are in engagement with one another, by means of which second group of guide means (4b, 5a), a displacement of the second support element (4) is determined in relation to the carrying frame (5) along a circular arc (KBz) around the second axis (z),
wherein the first and the second axes (y, z) are orientated perpendicular to one another, and
wherein the imaging optical element has an apex point (P), and the first and second axes (y, z) intersect one another in the region of the apex point (P).

2. The adjusting system (1) according to claim 1, wherein the first axis (y) is orientated horizontal and the second axis (z) is orientated vertical.

3. The adjusting system (1) according to claim 1, wherein the first axis is orientated vertical and the second axis is orientated horizontal.

4. The adjusting system (1) according to claim 1, wherein the imaging optical element has a main radiation direction along an optical axis, wherein the imaging optical element can be pivoted about the first and the second axes (y, z) in such a manner that the optical axis can be orientated perpendicular to the first and second axes (y, z).

5. The adjusting system (1) according to claim 1, wherein the imaging optical element is a projection lens.

6. The adjusting system (1) according to claim 1, wherein the first and the second axis (y, z) intersect one another.

7. The adjusting system (1) according to claim 1, wherein the first group of guide means (3a, 4a) has at least one circular-arc-shaped accommodating section (4a), in which at least one corresponding guide projection (3a) likewise assigned to the first group of guide means (3a, 4a) is accommodated, wherein the accommodating section (4a) is assigned to the second support element (4) and the guide projection (3a) is assigned to the first support element (3) or vice versa.

8. The adjusting system (1) according to claim 7, wherein a rotary shaft (4c) is mounted on the second support element (4), which is orientated parallel to the first axis (y) and has at least one toothed section (4c'), wherein the first support element (3) has a corresponding toothing (3c'), by means of which the first support element (3) is supported on the second support element (4), wherein the toothing (3c') of the first support element (3) is in engagement with the toothed section (4c') in such a manner that pivoting of the first support element (3) about the first axis (y) effects a rotational movement of the rotary shaft (4c).

9. The adjusting system (1) according to claim 1, wherein the second group of guide means (4b, 5a) has at least one circular-arc-shaped accommodating section (5a), in which at least one corresponding guide projection (4b) likewise assigned to the second group of guide means (4b, 5a) is accommodated, wherein the accommodating section (5a) is assigned to the carrying frame (5) and the guide projection (4b) is assigned to the second support element (4) or vice versa.

10. The adjusting system (1) according to claim 9, wherein a rotary shaft (5c) is mounted on the carrying frame (5), which is orientated parallel to the second axis (z) and has at least one toothed section (5c'), wherein the second support element (4) has a corresponding toothing (4c"), by means of which the second support element (4) is supported on the carrying frame (5), wherein the toothing (4c") of the second support element (4) is in engagement with the toothed section (5c') in such a manner that pivoting of the second support element (4) about the second axis (z) effects a rotational movement of the rotary shaft (5c).

11. The adjusting system (1) according to claim 1, wherein the first adjusting device (6) is configured to be fixedly connected to a vehicle headlamp housing, wherein the first adjusting device (6) has a pivoting arm (6a) pivotable by means of the first adjusting device (6) about an axis which is orientated parallel to the first axis (y), the pivoting arm (6a) comprising a coupling section (6d') configured to engage into a corresponding coupling section (3d') of the first support element (3) for pivoting the first support element (3) about the first axis (y), wherein the coupling sections (3d' and 6d') are configured to transmit a pivoting movement of the pivoting arm (6a) to the first support element (3) in a force-locking manner, wherein the coupling sections (3d' and 6d') are displaceable relatively to one another.

12. The adjusting system (1) according to claim 1, wherein the second adjusting device (7) is configured to be fixedly connected to a vehicle headlamp housing, wherein the second adjusting device (7) has a sliding arm (7a) displaceable in the direction of the first axis (y) by means of the second adjusting device (7), the sliding arm (7a) comprising a coupling section (7d') configured to engage into a corresponding coupling section (4d') of the second support element (4) for pivoting the second support element (4) about the second axis (z), wherein the coupling sections (4d' and 7d') are configured to transmit a sliding movement of the sliding arm (7a) to the second support element (4) in a force-locking manner.

13. An illumination device for a motor-vehicle headlamp, comprising the adjusting system (1) according to claim 1 and an imaging optical element.

14. A motor-vehicle headlamp comprising the adjusting system (1) according to claim 1.

15. The adjusting system (1) according to claim 1, wherein the imaging optical element is a projection lens.

* * * * *